(12) United States Patent
Ibasco et al.

(10) Patent No.: US 9,846,858 B2
(45) Date of Patent: Dec. 19, 2017

(54) SYSTEM AND METHOD FOR A GLOBAL DIRECTORY SERVICE

(75) Inventors: Alex D. Ibasco, Paranaque (PH); Eduardo Ramon G. Joson, Quezon (PH); Valenice G. Balace, Manila (PH); Jose Lorenzo L. Losantas, Quezon (PH)

(73) Assignee: EINNOVATIONS HOLDINGS PTE. LTD., Singapore (SG)

( * ) Notice: Subject to any disclaimer, the term of this patent is extended or adjusted under 35 U.S.C. 154(b) by 502 days.

(21) Appl. No.: 13/519,433

(22) PCT Filed: Dec. 15, 2010

(86) PCT No.: PCT/SG2010/000466
§ 371 (c)(1),
(2), (4) Date: Jun. 27, 2012

(87) PCT Pub. No.: WO2011/081603
PCT Pub. Date: Jul. 7, 2011

(65) Prior Publication Data
US 2012/0311676 A1    Dec. 6, 2012

(30) Foreign Application Priority Data
Jan. 4, 2010    (SG) .............................. 201000019-8

(51) Int. Cl.
*H04L 12/58*    (2006.01)
*G06Q 10/10*    (2012.01)
*H04L 29/12*    (2006.01)

(52) U.S. Cl.
CPC ......... *G06Q 10/10* (2013.01); *H04L 61/1594* (2013.01)

(58) Field of Classification Search
CPC ....... H04L 51/00; G06Q 10/10; G06Q 20/351
(Continued)

(56) References Cited

U.S. PATENT DOCUMENTS 5,493,105 A    2/1996 Desai
6,442,263 B1    8/2002 Beaton et al.
(Continued)

FOREIGN PATENT DOCUMENTS

CN    1509447    6/2004
CN    1716234    1/2006
(Continued)

*Primary Examiner* — Ellen Tran
(74) *Attorney, Agent, or Firm* — Intellectual Property Law Group LLP

(57) ABSTRACT

A system and method for facilitating the transfer of contact information between network subscribers said system including at least one server coupled to the network; at least one database coupled to the server; a plurality of subscriber terminals coupled to the network wherein each subscriber's terminal is configured to send contact information associated with a subscriber to the server in response to a request by said subscriber; wherein the request causes the subscriber's terminal to compile the contact information into an electronic business card object having one or more textual fields and map the one or more textual fields of the electronic business card to one or more object attributes contained in an electronic business card object and transmit the electronic business card object to the server for storage in the database is disclosed.

24 Claims, 12 Drawing Sheets

(58) Field of Classification Search
USPC .............................................. 726/4; 707/755
See application file for complete search history.

(56) References Cited

U.S. PATENT DOCUMENTS

| | | | |
|---|---|---|---|
| 6,889,213 | B1 | 5/2005 | Douvikas et al. |
| 7,017,109 | B1* | 3/2006 | Douvikas et al. ............ 715/236 |
| 7,246,099 | B2 | 7/2007 | Feldhahn |
| 2002/0138470 | A1 | 9/2002 | Zhou |
| 2003/0069746 | A1* | 4/2003 | Kuramatsu ....................... 705/1 |
| 2004/0093224 | A1 | 5/2004 | Vanska et al. |
| 2004/0119760 | A1 | 6/2004 | Grossman |
| 2005/0091074 | A1 | 4/2005 | Feldhahn |
| 2005/0149487 | A1* | 7/2005 | Celik ................................ 707/1 |
| 2006/0136251 | A1 | 6/2006 | Sung et al. |
| 2006/0293903 | A1 | 12/2006 | Ramanathan et al. |
| 2007/0027921 | A1* | 2/2007 | Alvarado et al. .......... 707/104.1 |
| 2008/0040322 | A1* | 2/2008 | Rucker et al. .................... 707/3 |
| 2010/0010873 | A1* | 1/2010 | Moreau ........................... 705/10 |

FOREIGN PATENT DOCUMENTS

| | | |
|---|---|---|
| EA | 007036 | 6/2006 |
| EP | 1589730 A1 | 10/2005 |
| JP | 08-506670 | 7/1996 |
| JP | 2002-203131 | 7/2002 |
| JP | 2003-030211 | 1/2003 |
| JP | 2004-110366 | 4/2004 |
| JP | 2004-199644 | 7/2004 |
| JP | 2006-236320 | 9/2006 |
| KR | 2002/0005273 | 1/2002 |
| RU | 2246754 | 2/2005 |

\* cited by examiner

SYSTEM AND METHOD FOR A GLOBAL DIRECTORY SERVICE

FIELD OF THE INVENTION

The present invention relates to the provision of contact information between network subscribers. In particular, although not exclusively, the present invention relates to a system and method for a global directory service using electronic business card objects.

BACKGROUND

The use of electronic business cards was originally proposed by the Versit Consortium in 1995 and subsequently taken up by the Internet Mail Consortium (IMC). The IMC has since developed a number of standards for electronic business cards such as the vCard or hCard, the latest of which is the open standard vCard v3.0. The vCard v3.0. is defined under two Internet Engineering Task Force (IETF) documents; i.e. under Request for Comments (RFC) 2425 (MIME Content-Type for Directory Information) and under RFC 2426 (MIME Directory Profile). As defined in the standards, both vCard and hCard can contain metadata, semantic information, graphics and images, and even audio or video clips. As defined in the standards, therefore, both vCard and the hCard are mere passive information elements.

One example of the use of vCards is discussed in European Patent Application No. EP 1589730 entitled "Method for Management of vCards". EP 1589730 is directed to a method for creating the vCards on a mobile terminal and exchanging the vCards between mobile terminal and other devices. Under the method of EP 1589730 the vCard is stored as image data in a JPEG file by inserting the vCard data in MIME type into the JPEG header.

U.S. Pat. No. 6,442,263 to Beaton et al entitled "Electronic Business Cards" discusses a method for providing electronic business cards for a communication device. Under the method of Beaton, business cards are created using CLID information, transferred among users of a telephone network, and used to initiate a call automatically.

Another system which utilises the vCard platform is disclosed in U.S. Pat. No. 7,246,099 to Feldhahn. Feldhahn allows individuals to maintain current contact information in another individual's contact software without having to individually notify the receiving individual or manually resend the updated contact information to the individual. Static contact information for an individual is stored on a central server and is assigned a globally unique ID. The static contact information includes a dynamic link containing a creator's globally unique ID that may be utilized by recipients of the contact information to retrieve updated contact information.

U.S. Pat. No. 5,493,015 to Desai describes an electronic business card system which provides a compact and portable system to read and store business card data from business cards having computer readable data stored on computer readable storage media on the business cards. The electronic business card system utilizes a reader coupled to a computer control system. The electronic business card system also provides organization and manipulation capabilities for the business card data accepted by the electronic business card system.

While electronic business card such as the vCard or hCard can be employed in a number of applications, the functionality of the electronic business cards is at present somewhat limited. It would be clearly advantageous to extend the functionality of such cards so that they include functions, scripts, and actionable elements. The present invention seeks to address such limitation of the existing electronic business card standards and implementation.

SUMMARY OF THE INVENTION

Accordingly in one aspect of the present invention there is provided a method of transferring contact information between a plurality of network subscribers, said method comprising the steps of:

compiling at a subscriber terminal the contact information into an electronic business card having one or more textual fields;

registering the electronic business card with a directory wherein the step of registering the electronic business card further includes:

encapsulating the electronic business card in an electronic business card object by mapping the textual fields of the electronic business card to one or more object attributes contained in the electronic business card object;

transmitting the electronic business card object to directory; and storing the electronic business card object in a database receiving at the directory a set of search parameters from a subscriber;

searching the database for electronic business card objects that match the search parameters providing a listing of electronic business card objects to the subscriber;

receiving at the directory a request from the subscriber for an electronic business card object from the provided listing of electronic business card objects; and forwarding the requested electronic business card object to the subscriber.

Suitably the classes of the electronic business card objects each include attributes and methods. A method is a function or routine that manipulates an attribute, utilises an attribute or performs some other function. The electronic business card objects may also include one or more actionable elements. These elements may include scripts that launch a native device application, launch an application or service, and/or initiate a web-based or a wap-based interface. The electronic business card objects may include metadata, semantic information, graphics, images, and even audio or video clips.

In one embodiment of the present invention the electronic business card object may be a pointer to and a mask of a plurality of electronic business card objects, such that any user action on the electronic business card object acting as pointer to a plurality of electronic business card objects is effectively the same action individually on each of the electronic business card objects in such plurality of electronic business card objects.

Preferably the network is a mobile communications network, IP network or the like.

The step of registering may further include the step of validating a set of subscriber credentials. The subscriber credentials may be passive or active credentials or a combination of both. Passive credentials may include but not be limited to the mobile phone number of the requesting party and/or any such information which can be obtained and authenticated via SIM authentication from said party without its active knowledge or participation. Active credentials include but shall not be limited to a PIN, password, and/or any such information which a party has to explicitly provide.

Suitably the search parameters may be a set of keywords. In such instance the step of receiving may include parsing received keywords prior to initiating the appropriate database query using the said keywords.

The step of providing a listing of electronic business card objects may include the step of sorting and/or filtering the results of the query according to existing business rules. Such rules may include but are not limited to the relative weights accorded to the verified status of an object, confirmed relationships as attribute of an object, the level of keyword match precision, recency of information, Boolean operation, if any, and other considerations.

The method may further include the step of allowing a subscriber or any authorized party to update or delete any of the attributes of the electronic business card object. Suitably the step of updating the attributes of the electronic business card object may be performed via a plurality of user interfaces, including but is not limited to a web or a wap interface, a local application, or a menu system using email, SMS, MMS, flash message, or an IP technology.

The method may also include the step of receiving a request for synchronization or download from a subscriber. Suitably the step of synchronizing further includes verifying the existence of the electronic business card object/s requested to be synchronized or downloaded and verifying the privacy or access level settings of the electronic business card object(s) requested to be synchronized or downloaded and sending an actionable notification to the owner of the electronic business card object(s) requested to be synchronized or downloaded for the allowance or disallowance of the request, if the privacy or access level settings of electronic business card object(s) require consent prior to synchronization or download and sending a synchronization update or a copy of the electronic business card object(s) requested to be synchronized or downloaded to the requesting subscriber on allowance of the synchronization or download request, or if the privacy or access level settings of such object(s) do not require consent prior to synchronization or download; and sending an appropriate notification to the requesting party.

The method may also include the step of verifying and authenticating the content of the electronic business card object. The step of verifying and authenticating may include tagging the object requested to be verified as certified on successful verification or authentication of the data in the electronic business card object and sending an appropriate notification to the concerned party/parties. Alternatively the step of verifying and authenticating may include automatically performing electronic business card object verification by confidence level scoring with the use of an existing post-paid subscriber database, use of verified relationships associated with the object, use of profile information, and the like or a combination of any or all of these, subject to predefined business rules and subsequently tagging those objects yielding a confidence level equal to or higher than a predefined threshold, as verified.

In a further aspect of the present invention there is provided a system for facilitating the transfer of contact information between network subscribers said system including:
  at least one server coupled to the network;
  at least one database coupled to the server;
  a plurality of subscriber terminals coupled to the network wherein each subscriber's terminal is configured to send contact information associated with a subscriber to the server in response to a request by said subscriber; wherein the request causes the subscriber's terminal to compile the contact information into an electronic business card having one or more textual fields and map the one or more textual fields of the electronic business card to one or more attributes of an electronic business card object and transmit the electronic business card object to the server for storage in the database.

Preferably the network is a mobile communications network, IP network or the like.

A subscriber may search and/or browse through the plurality of electronic business card objects stored in the database, in which the searching/browsing may be performed via a plurality of user interfaces, including but is not limited to a web or a wap interface, a local application, or a menu system using email, SMS, MMS, flash message, or an IP technology.

The system may allow a subscriber or any authorized party to update or delete any of the attributes of the electronic business card object. Suitably the step of updating the attributes of the electronic business card object may be performed via a plurality of user interfaces, including but is not limited to a web or a wap interface, a local application, or a menu system using email, SMS, MMS, flash message, or an IP technology.

The electronic business card objects stored in the database may be tagged as being a certified entry. A certified electronic business card object is one which the server provides a minimum level of certainty that the information in the business card object contains the information of the person or entity to which such business card object purports to pertain. The certification of an electronic business card is based on a confidence level resulting from a verification process which could include, but is not limited to, requiring physical presence and submission of credentials, use of an existing post-paid subscriber database, use of verified relationships associated with the object, or a combination of any or all of these, subject to certain business rules. Aside from the confidence level accorded to a verified electronic business card object, the verified status is likewise used to increase its relative weight in a search result, where a query has multiple exact and/or similar matches.

Suitably the system may be implemented as a distributed system across a plurality of networks. In such instance the global directory could include a plurality of computing platform coupled to each network within the plurality of networks, each computing platform being adapted to host, manage and maintain a global directory service.

BRIEF DESCRIPTION OF THE DRAWINGS

In order that this invention may be more readily understood and put into practical effect, reference will now be made to the accompanying drawings, which illustrate preferred embodiments of the invention, and wherein.

DETAILED DESCRIPTION

Figure 1:
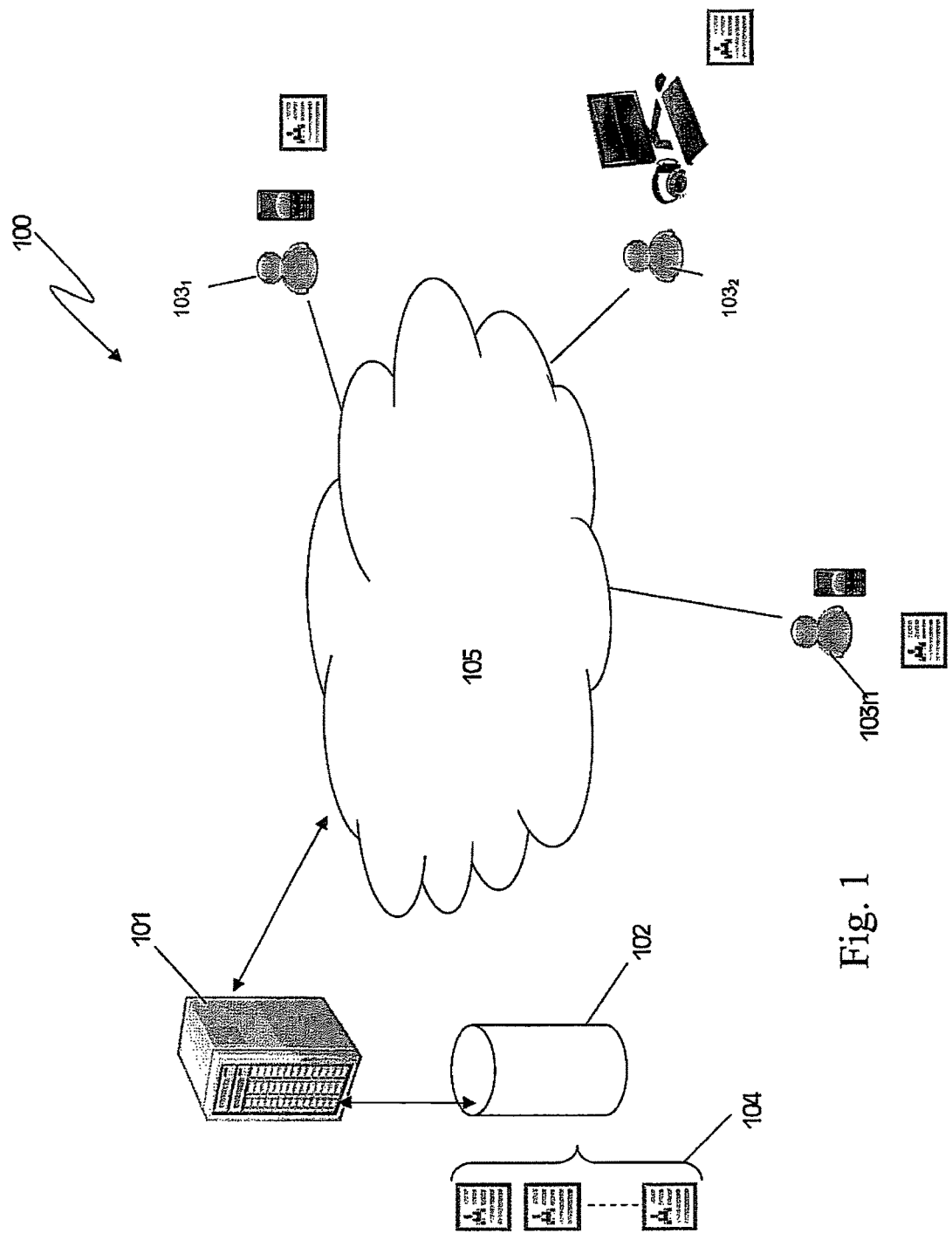
FIG. 1 is a schematic diagram depicting a system for facilitating the transfer of contact information between network subscribers according to one embodiment of the present invention.

With reference to FIG. 1 there is illustrated a system for facilitating the transfer of contact information between a plurality of network subscribers 100 which the applicant has termed a global directory. As shown the global directory includes at least one server 101 coupled to a database 102 containing contact information for one or more registered parties 104. As shown the server coupled to a host network 102 which provides a number of services to a plurality of subscribers $103_1, 103_2, \ldots, 103_n$ including registration and retrieval of contact information from the global directory. Each subscriber $103_1, 103_2, \ldots, 103_n$ can access the global directory to enter their contact information. Once registered, the contact details of the particular subscriber can be retrieved by any other subscriber $103_1, 103_2, \ldots, 103_n$ via a query to the global directory service. The various registration and retrieval procedures etc are discussed in greater detail below.

While the above global directory system has been described in terms of a server coupled to a singular host network, it will appreciated by one of skill in the art, that the global directory may also be implemented as a distributed system across a plurality of networks. In such instance, the global directory could include a plurality of computing platforms coupled to each network within the plurality of networks, each computing platform being adapted to host, manage and maintain a global directory service.

Figure 2:
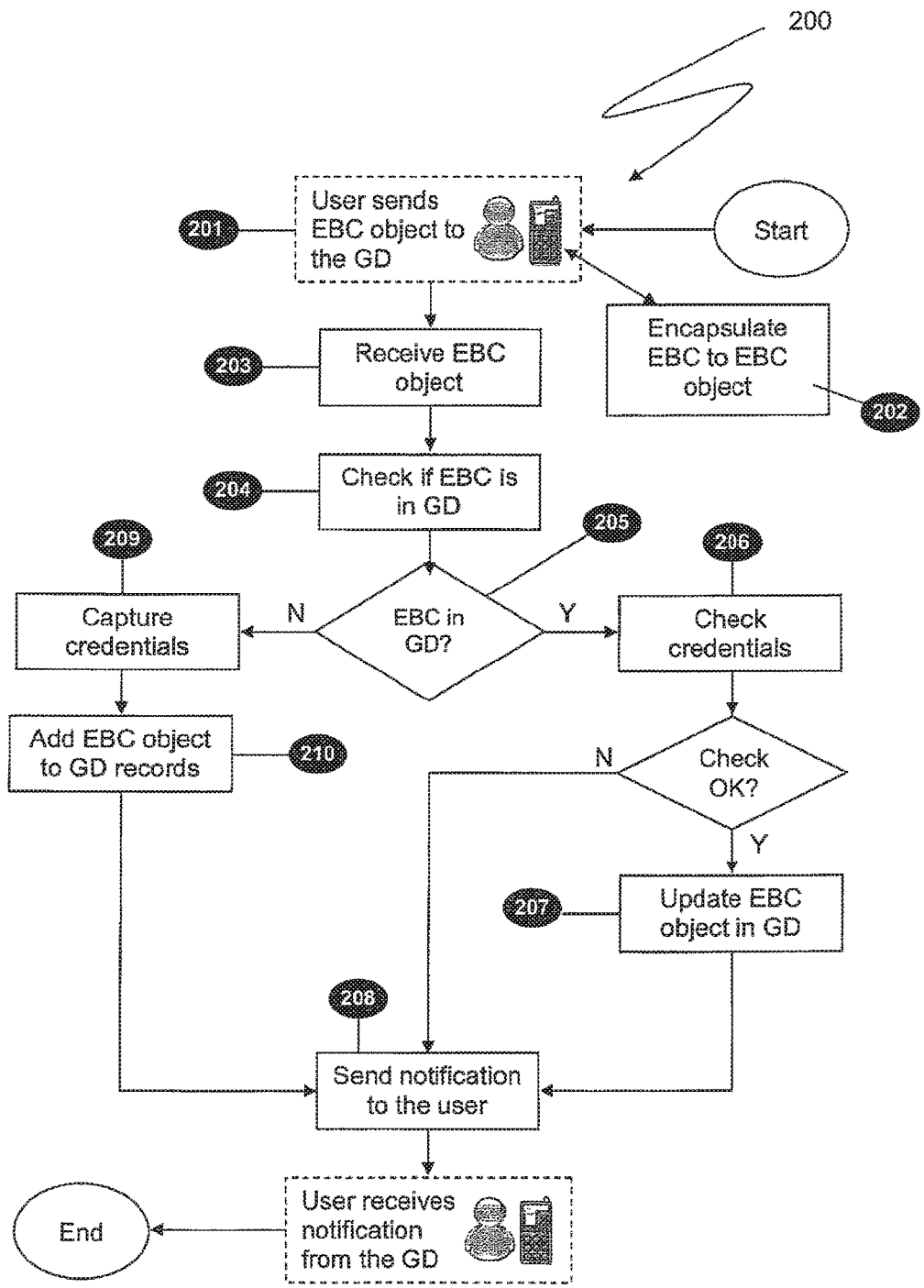
FIG. 2 depicting the process of updating an electronic business card object according to one embodiment of the present invention.

FIG. 2 illustrates a registration procedure 200 that permits a subscriber to add or amend their contact details contained in the global directory according to one embodiment of the present invention. In order to register their details with the global directory, a subscriber is required to send their contact details (step 201) in the form of an electronic business card (EBC) to the global directory service. Prior to transmission the EBC is encapsulated as an object (step 202), hereinafter referred to an EBC object. It is the EBC object that is then forwarded (step 203) to the global directory service for registration. The encapsulation of the electronic business card into the electronic business card object is essentially a mapping of the various fields of the vCard, which are mere textual information, to textual information attributes within the relevant attributes of the EBC object. At this point, the mapping utilises a one-to-one correspondence between vCard information and an EBC object attribute, or possibly a correspondence that is defined via business rule definition.

On receipt of the EBC object (step 204) the global directory service proceeds to check if the EBC object is stored in its database (step 205). If a record of the EBC object is found on the global directory it then proceeds to verify the credentials of the subscriber (step 206). The credentials may include one or more of the following: mobile phone number or SIM identity or IMEI of the requesting party and/or any such information which can be obtained from said party without its active knowledge or participation, a PIN, password and/or any such information which a party has to explicitly provide. If the credentials are sufficient, the user's previous entry within global directory's database is updated with the data contained in the EBC object (step 207). A notification of the successful update is sent (step 208) to the user.

In the event there is no record of the EBC object within the database (i.e. a new subscriber requesting registration) the global directory service captures the user's credentials (step 209). Once the global directory service has extracted the relevant credentials the global directory then stores the EBC object in its database. Once the EBC object is stored the global directory it then proceeds to send a notification to the subscriber (step 208). Such a new entry would be tagged as unvalidated or unverified by default.

Figure 3:
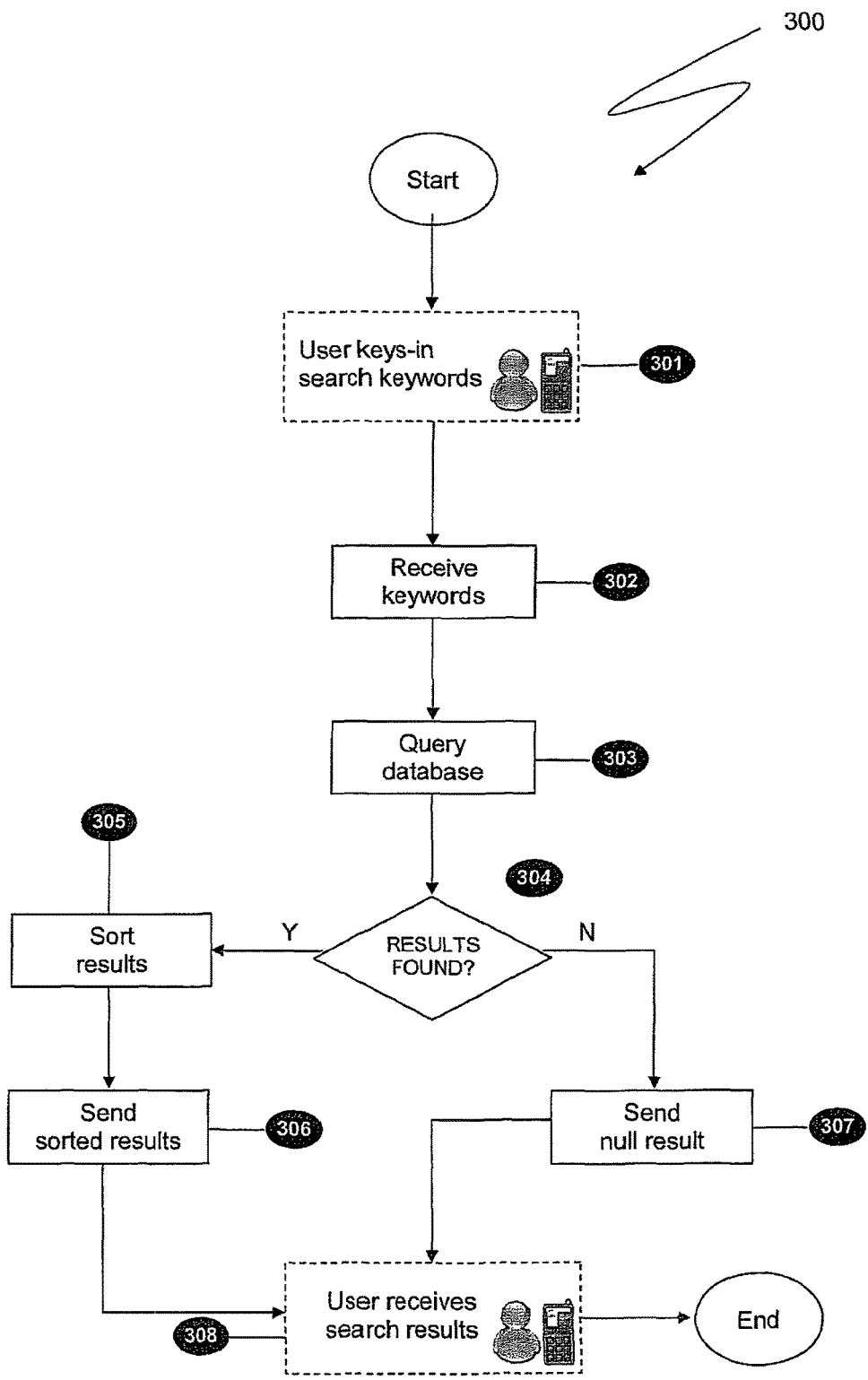
FIG. 3 is a schematic diagram depicting a search procedure according to one embodiment of the present invention.

FIG. 3 depicts a process 300 for enabling a subscriber to search the information contained in the global directory according to one embodiment of the present invention. As shown, the search process is initialised by a subscriber entering a set of search parameters e.g. a set of keywords (step 301). The search parameters are then forwarded (step 302) to the global directory. On receipt of the search parameters the global directory service proceeds to query its database (step 303) for EBC objects containing attributes that match (step 304) the search parameters.

In the event that there are EBC objects within the database that match the search parameters the directory service then compiles a sorted list of these matching EBC objects (step 305) subject to privacy parameters. The sorted list is then forwarded (step 306) to the subscriber for display on their terminal (step 308). If there are no matching results based on step 304 from the database query 303 the global directory proceeds to send a notification to the subscriber indicating that no results were found (step 307). The null result is then displayed to the subscriber's terminal 308.

On receipt of the sorted listing of results based on step 306, the subscriber can then retrieve the desired electronic business card object from the global directory (step 308) subject to privacy parameters.

The privacy parameters which may be supported by the system provide for specific privacy settings which define the extent to which information from one's EBC object is made publicly available. Different levels of availability of information can be set and limited to different groups, each group defined by established relationships with the EBC object owner, degrees of relationship, common profile elements, and such other suitable distinction(s) that could be used as basis in calling a group a group. Thus the EBC object forwarded to a subscriber may vary from subscriber to subscriber, depending on the different levels of privacy control applied for example a subscriber may belong to a trusted group of the EBC object owner, hence the EBC object that will be forwarded to such subscriber will contain information attributes and methods which may not be available to another subscriber from another group.

Given the current trends in information technology, a person may have different phone numbers, different email addresses or similar information. This plurality of information may form the basis of different EBC objects configurations given a specific user's privacy settings or preferences, but all such information pertains to a single person. In such instances the GD may assign an internal Customer Reference Number (CRN) for the given EBC object owner. The CRN is then utilised to associate on-the-fly a particular EBC objects for the subscriber with the relevant information. Thus, the phone number of a person may be different from the perspective of two subscribers having requested the same EBC objects, but both numbers will connect a phone call to the same person.

Since the CRN as discussed above uniquely identifies an EBC object owner, the system likewise makes possible the use of fun numbers. Fun numbers are numbers associated with both the EBC object owner and the subscriber requesting the EBC object. The fun number is generated on-the-fly, but is valid as a unique communications identifier (a phone number, an email address, a URL and the like) between the EBC object owner and the requesting subscriber unless otherwise disabled by the EBC object owner. A different fun number is associated with each requesting subscriber, but this plurality of fun numbers is associated with a single EBC object owner. The fun number employs end-to-end association, hence the fun number is associated with both the CRN of the EBC object owner and the CRN of the requesting subscriber. This allows for bidirectional communication between the two parties. Use of the fun number generated for a subscriber by a third party to connect to the EBC owner or subscriber associated with the fun number is not allowed as this Fun number system employs a built-in authentication mechanism. That is, only the person for whom a fun number has been generated can use the fun number to connect to the person at the other end to whom the fun number is associated.

Figure 4:
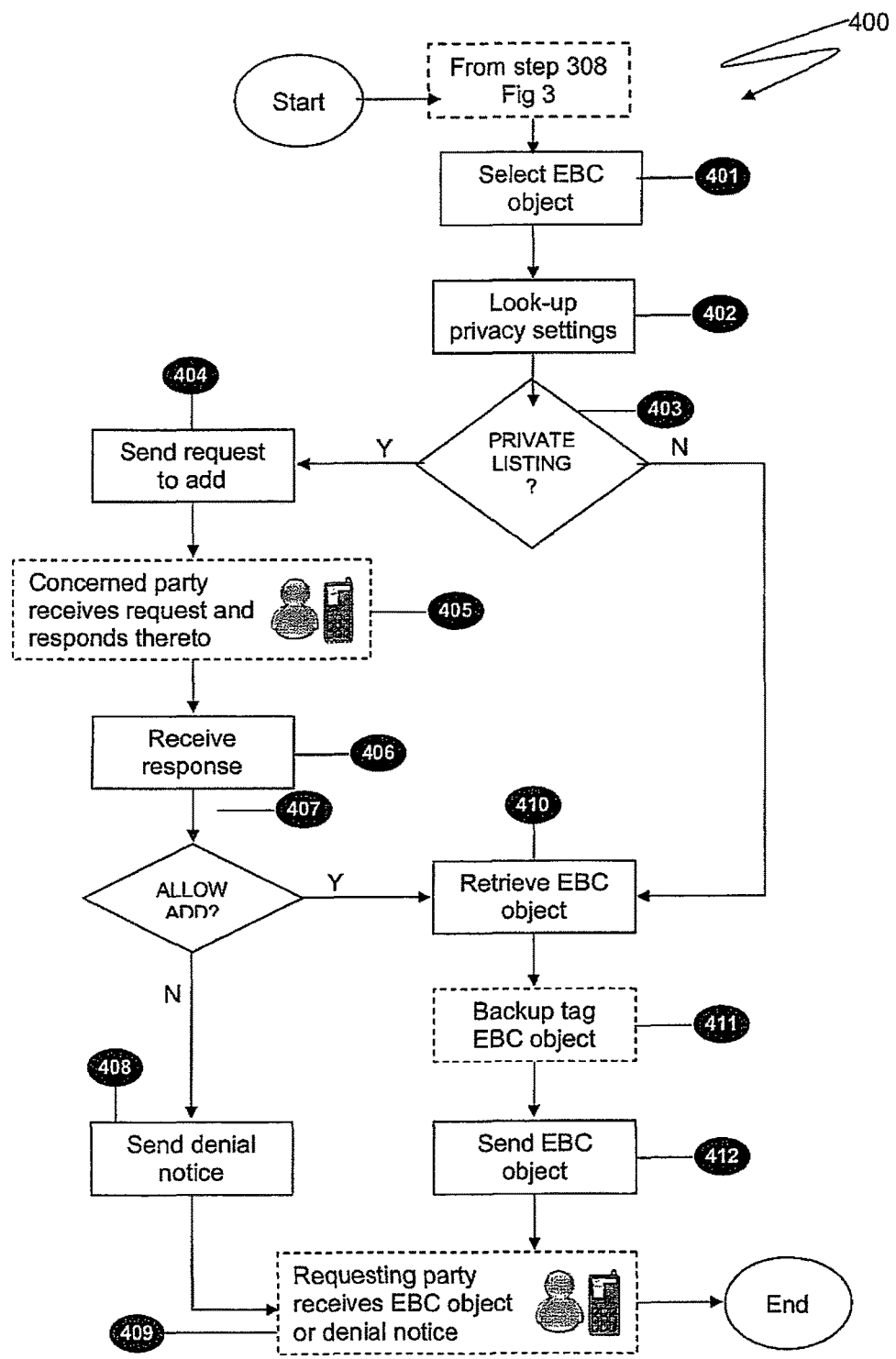
FIG. 4 is a schematic diagram depicting the retrieval of an electronic business card object according to one embodiment of the present invention.

One example of the retrieval for process 400 for EBC objects form the GD according to one embodiment of the present invention is illustrated in FIG. 4. As shown the subscriber is presented with the sorted list of EBC objects from step 308 of FIG. 3. The subscriber then selects the entry (step 401) in the list for which they wish to retrieve the electronic business card object. The selection is then communicated to the global directory which then proceeds to look up the privacy settings (step 402) assigned to the EBC object. In this particular case the EBC objects are divided into two groups, i.e. private and public listings.

If the requested EBC object is determined to be a private listing based on step 403 the directory service then sends a request 404, in the form of an actionable message, to the owner of the EBC object (step 405) for permission to disclose the information contained in the EBC object to the requesting party. The owner on receipt of the request then sends a response back to the directory service (step 406). The directory service then determines whether the owner of the EBC object has given permission to provide the requested information or denied the request (step 407). If the owner has denied permission to provide the requested EBC object the global directory proceeds to send a denial notice (step 408) to the requesting party 409.

In the event that the owner of the EBC object has given permission to provide the requested information to the requesting party the directory service proceeds to retrieve the EBC object from its database (step 410). Prior to sending the EBC object (step 412) to the requesting party 409 the directory service may tag the EBC object (step 411) as part of the back-up contact list for the requesting party. As can be seen from FIG. 4 these steps are also followed in the event that the EBC object is determined to be a public listing.

Figure 5:
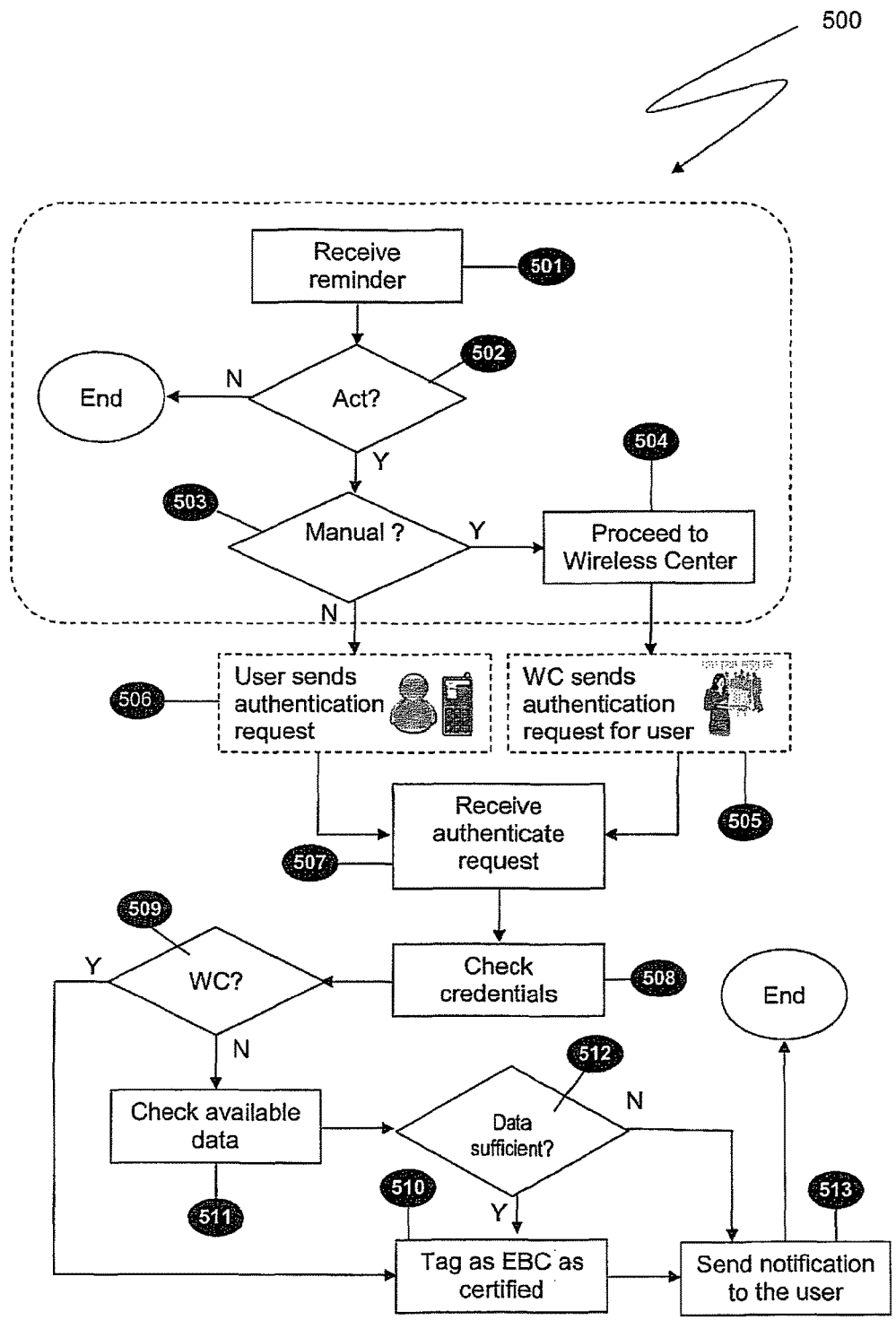
FIG. 5 is a schematic diagram depicting the process of verification and authentication an electronic business card object according to one embodiment of the present invention.

With reference to FIG. 5 there is illustrated one possible configuration of a verification and authentication procedure 500 of electronic business card objects stored within the global directory according to one embodiment of the present invention. As shown the global directory is configured to send a reminder to each subscriber registered with the directory i.e. each subscriber having a stored EBC object within the directory. On receipt of the reminder (step 501) the subscriber has the option to proceed with authentication and verification or to opt out based on step 502. If the user opts out of the verification procedure the process is terminated.

In the event the user selects to proceed with the verification process the subscriber is presented with the option for manual or automatic verification (step 503). If the subscriber selects manual verification the user is required to physically attend a recognised Global Directory Wireless Data Centre 504 (e.g. mobile subscriber's retail data centre etc) and provide the suitable documentation. The wireless data centre then proceeds to send an authentication request for the user (step 505) to the global directory. By contrast, selecting the automatic authentication option causes an authentication request to be sent directly from the subscriber's mobile device (step 506) to the global directory.

On receipt of an authentication request (step 507) the global directory proceeds to check the credentials of the sending party (step 508) to determine if the request was sent via a wireless data centre or user initiated (step 509). If the request was sent by a Wireless Data Centre the EBC object is then tagged as being certified (step 510) i.e. data contained in EBC has been independently verified and authenticated. A notification of the successful verification and authentication is then sent to the subscriber (step 513).

If the global directory determines that the request was sent by the subscriber the global directory proceeds to check all available data (step 511) regarding the EBC object to verify and authenticate the identity of the requesting party. The data may include, but not limited to, established links and relationships between the EBC object with other certified EBC objects, information contained in the subscriber's Internet Service Provider (ISP) or Mobile Service Provider databases or other third party databases e.g. account information in a social network, utilities consumer databases, etc. If the data obtained is sufficient based on decision step 512, then the authentication request is granted and the EBC object is tagged as being certified (step 510). A notification of the successful verification and authentication is then sent to the subscriber (step 513). If the available data is not sufficient based on decision step 512 to permit the global directory to verify and authenticate the identity of the requesting party a failure notification is then forwarded to the requesting party (step 513).

As can be seen from the above discussion the verification and authentication process is designed to provide a certain level of confidence that the information contained in the EBC object is the correct information relating to a particular person or entity identified in the EBC object. Any action taken in relation to the information contained in a non-certified EBC object by a subscriber is at the subscriber's own risk, as the global directory cannot provide any level of certainty that the information contained in non-certified EBC object is accurate.

Figure 6:
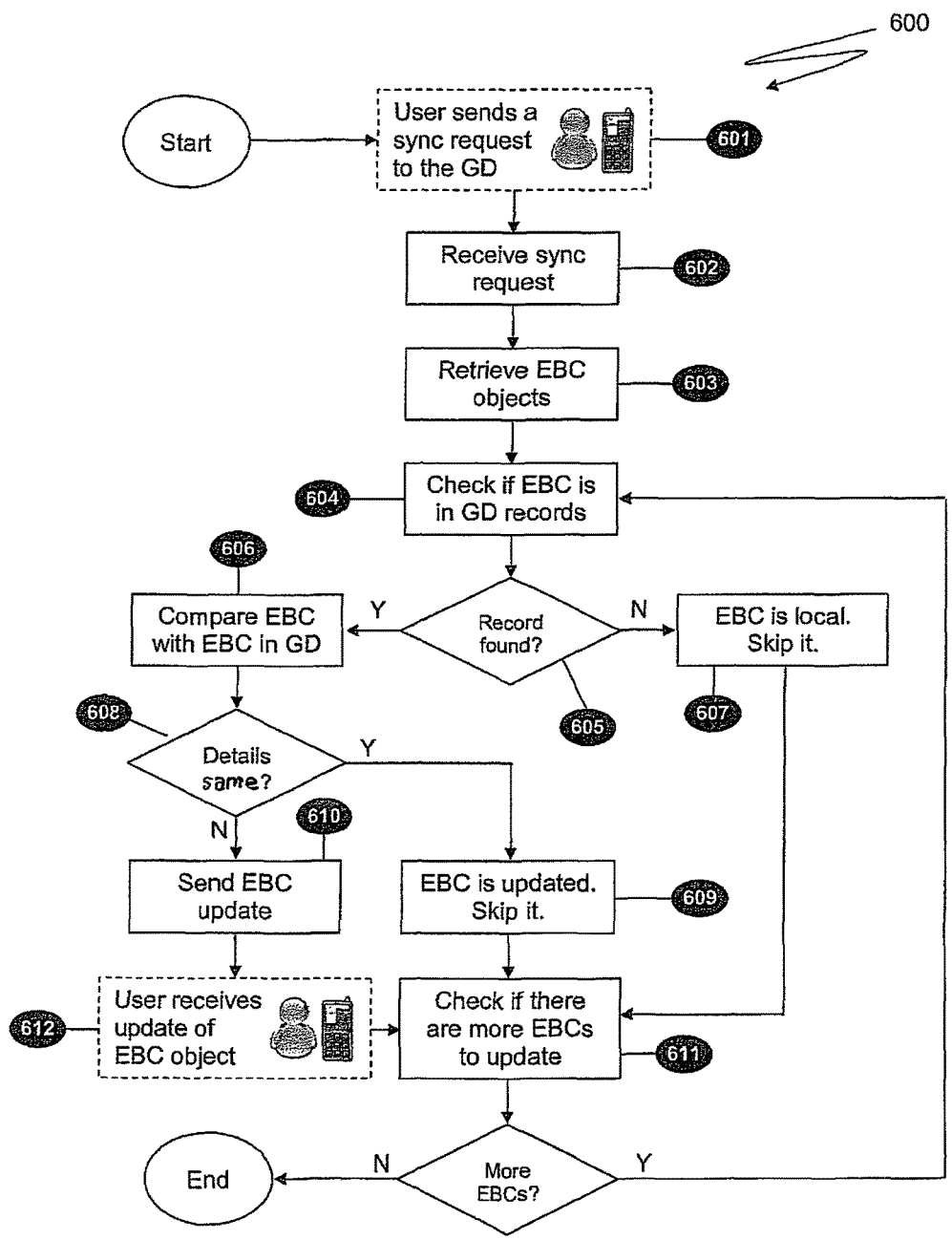
FIG. 6 is a schematic diagram depicting the process of synchronizing the electronic business card objects local on a mobile device with the retrieved card details according to one embodiment of the present invention.

One example of a process for synchronizing electronic business card objects stored locally on a mobile device with the corresponding entries in the global directory according to one aspect of the present invention is shown in FIG. 6. The synchronization process is initiated by subscriber sending a sync request (step 601) to the global directory. On receipt of the sync request (step 602) the global directory proceeds to retrieve all EBC objects stored on the subscriber's mobile device (step 603).

Once the global directory has retrieved the listing of EBC objects from the mobile device, the global directory begins to compare the entries in the retrieved listing of EBC objects with the EBC objects contained in its database. As shown, the global directory compares the first entry in the retrieved listing of EBC objects with each EBC object stored in its database (step 604). If there is no record of a given EBC object in the database (step 605), the EBC object is considered as being a manually added entry and the global directory skips the entry (step 607). The global directory then determines if there are more EBC objects within the listing of retrieved EBC objects to be checked (step 611) and if so the global directory proceeds to check the next EBC object in the listing of retrieved EBC objects (step 604).

If at step 604 a matching record of the EBC object retrieved from the subscriber's device is found, the global directory then compares the data contained in the retrieved EBC with the data contained in the EBC stored in its database (step 606). If the data contained in each of the EBC objects is the same based on step 608, then the information contained in the EBC on the subscriber's device is considered as being up-to-date and no further action is required and the entry is skipped (step 609). The global directory then determines if there are more EBC objects within the listing of retrieved EBC objects to be checked (step 611) and if so the global directory proceeds to check the next EBC object in the listing of retrieved EBC objects (step 604).

In the event that the data contained in the EBC object retrieved from the subscriber's device does not match the data contained in the EBC object contained in the global directory at step 608, the directory considers the data in the EBC retrieved from the subscriber's device as being out of date and in need of updating. The global directory then sends an update to the subscriber containing the updated EBC object to the subscriber's device (step 610). On receipt of the update (step 612) the data contained in the EBC object stored on the subscriber's device is overwritten with the data contained in the notification. The global directory then determines if there are more EBC objects within the listing of retrieved EBC objects to be checked (step 611) and if so the global directory proceeds to check the next EBC object in the listing of retrieved EBC objects (step 604).

The synchronisation process as detailed above is repeated for each entry in the listing of EBC objects retrieved by the global directory until no more entries remain in the listing of EBC objects retrieved from the subscriber's device. At the conclusion of a successful full synchronization, the system may set a checkpoint object, so that subsequent synchronizations may be handled incrementally as opposed to performing a full scan.

Figure 7A:
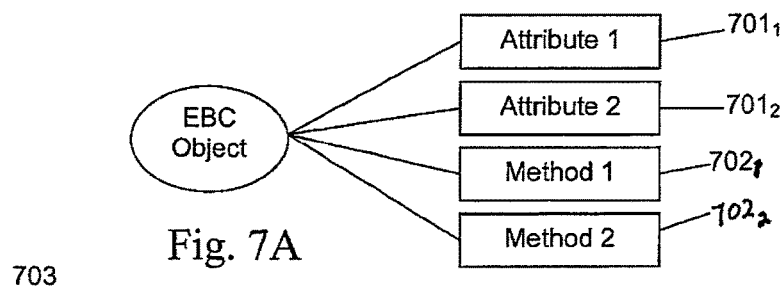
FIG. 7A is a conceptual diagram of one possible architecture of an EBC object according to one embodiment of the present invention.

As briefly mentioned above, the EBC object includes a number of attributes and methods, a conceptual diagram of the structure of one embodiment of an EBC object is depicted in FIG. 7A. In this particular example, the EBC object includes two attributes $701_1$, $701_2$ and two methods $702_1$, $702_2$. As mentioned above, the attributes are informational attributes and may be associated with various textual field of an entities virtual business card. Methods on other hand define actions which can be done to the EBC object.

In order to take advantage of the object orientated paradigm offered by the EBC object structure the applicant has developed a specialized menu interface. At present most menu systems at present are process oriented, i.e. menu systems are designed to reflect a sequence of user actions required to achieve a particular task. The menu interface proposed by the applicant is an object centric menu system which focuses on what a user can do to a particular object.

Figure 7B:
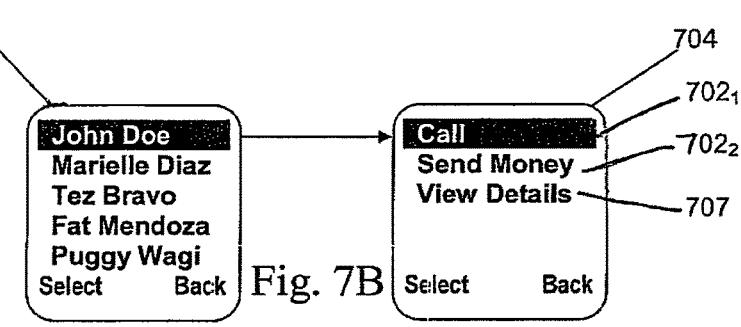
FIG. 7B is a schematic diagram depicting one possible menu structure produced from the EBC object architecture of FIG. 7A.

An example of the menu system for interpreting the information stored in the EBC object in the context of a mobile handset is shown in FIG. 7B. In this case the EBC object is read by the menu system's menu engine and displayed to the user as a phonebook entry 703. In order to display the EBC object as a phonebook entry the menu engine determines the value assigned to the "name attribute" of the EBC object. As shown in the example of FIG. 7A, the EBC object contains two attributes $701_1$, $701_2$. Either of these attributes may be assigned as the name attribute. In this example the first attribute $701_1$ is the name attribute and contains the relevant information regarding the entity name e.g. "John Doe". The second attribute $701_2$ in this instance is associated with the phone number of the entity. For ease of description, the attribute associated with an entities contact phone number or numbers will be hereinafter referred to as phone attribute.

As with a standard phone book entry item, the user is free to select the item to bring up a submenu 704. The submenu 704 in this instance presents the user with a selection of the available methods associated with the relevant attributes of the EBC object. In this instance the methods $702_1$ and $702_2$ are assigned specific tasks "Call" and "Send Money". Method $702_1$ in this instance is assigned the "Call" function and as such, the method is associated with attribute $701_2$ i.e. the phone attribute. Selecting call on the menu display 704 causes method $702_1$ to retrieve the relevant contact number from the phone attribute $701_2$ and initiate a call to the relevant party. Thus no additional menu interaction is required on the part of the user to initiate the call. Similarly, selection of the "Send Money" option will cause method two $702_2$ to initiate the relevant actions to effect transfer of an amount designated by the mobile user to an account specified in one of the attributes $701_1$, $701_2$.

As depicted the submenu 704 also includes a default menu item, "View Details" 707. This menu item allows for viewing and editing of the values of the other informational attributes, such as maybe an email address, birthday, and the like contained in one or more attributes of the EBC object.

Figure 7C:
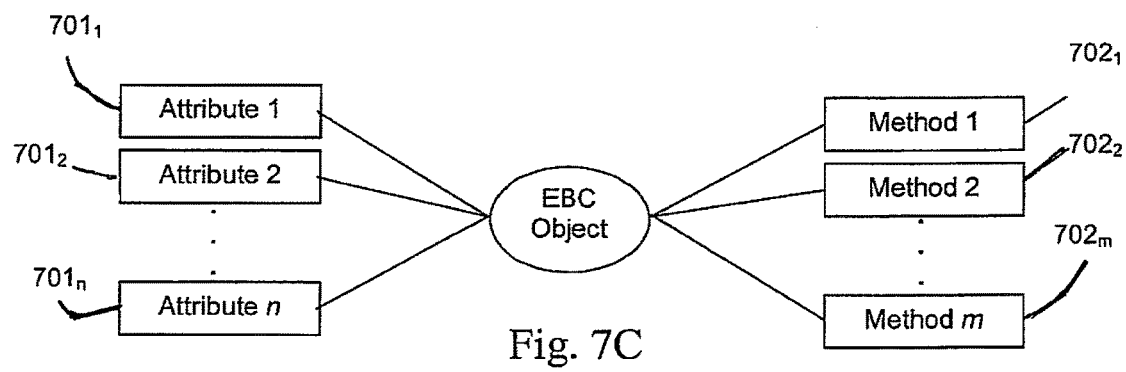
FIG. 7C is a conceptual diagram of one possible architecture of an EBC object according to one embodiment of the present invention.

While the examples depicted in FIGS. 7A and 7B utilize two attributes and methods, it will be appreciated by one of skill in art that the EBC object may include multiple attributes and methods. A conceptual diagram of the structure of an EBC object having multiple attributes and methods is shown in FIG. 7C. As shown the Attributes can range from 1 to n, where n is an upper limit. Similarly, methods can be from 1 to m, where m is an upper limit.

Figure 7D:
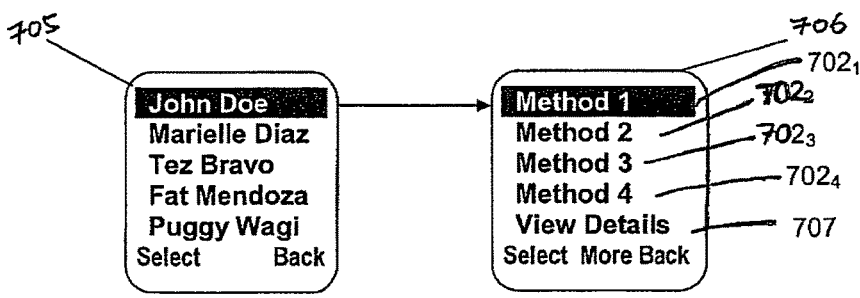
FIG. 7D is a schematic diagram depicting one possible menu structure produced from the EBC object architecture of FIG. 7C.

FIG. 7D depicts the menus generated by the menu engine for an EBC object having the structure depicted in FIG. 7C. As with the examples discussed above, the menu engine in this instance translates the value contained in the name attribute of the EBC object and presents the information to the user in the form of a phone book entry 705. Selection of the entry "John Doe" displays the submenu 706 containing a listing of the available methods $702_1$, $702_2$, . . . , $702_m$. As shown the methods displayed as menu items are limited only to such number of methods minus one that could fit on screen. In the example above, while 5 methods as menu items will fit on screen, only 4 menu items corresponding method 1 to 4 ($702_1$, $702_2$, $702_3$, $702_4$) are shown to give way to the required menu item "View Details" 707. The menu engine then maps a key on the mobile device that enables scrolling to a next screen full of menu items. This could be use of the directional keys, a built-in joystick, or any hotkey designated for such purpose. Thus, the next screen full will show Method 5 to Method 9 with the last available screen displaying Method (m−4) to Method m.

Under the applicant's proposed menu system, the EBC objects may also be provided with a non-visible attribute "Context". The context attribute defines a set of default attributes and methods associated with an EBC object. An example of the use of the context attribute is set out in Table 1 below. In this particular case 3 context types are provided, each context having a set of default attributes and methods.

TABLE 1

Default Number of Attributes & Methods for Specific Contexts

| Context | Attributes | Methods |
| --- | --- | --- |
| Person | 6 | 7 |
| Institution | 4 | 5 |
| Device Owner | 6 | 5 |

It will be appreciated by those of skill in the art that the above table is merely illustrative and does not limit the definition of each context. It does not likewise limit the number of contexts which can be defined under the proposed menu system.

Figure 8A:
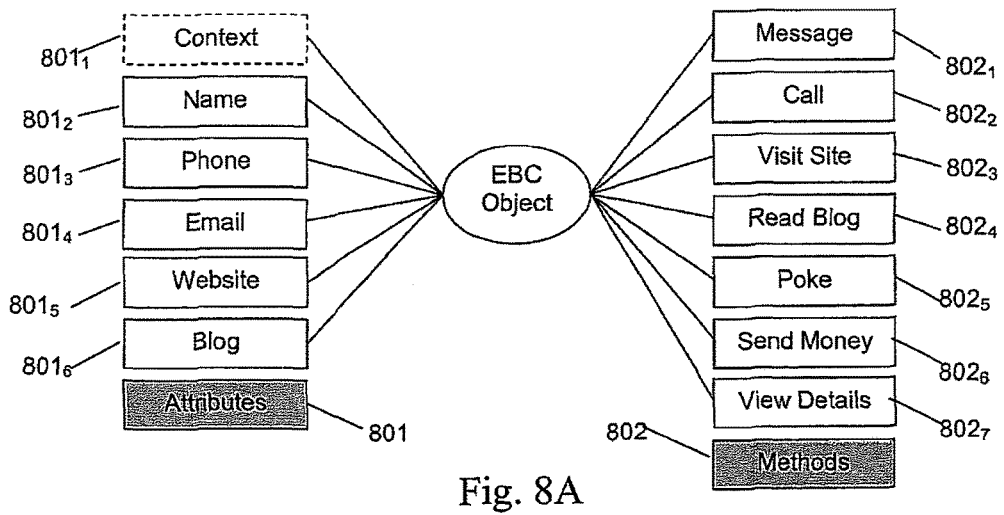
FIG. 8A is a conceptual diagram of one possible architecture of an EBC object assigned a particular context according to one embodiment of the present invention.
Figure 8B:
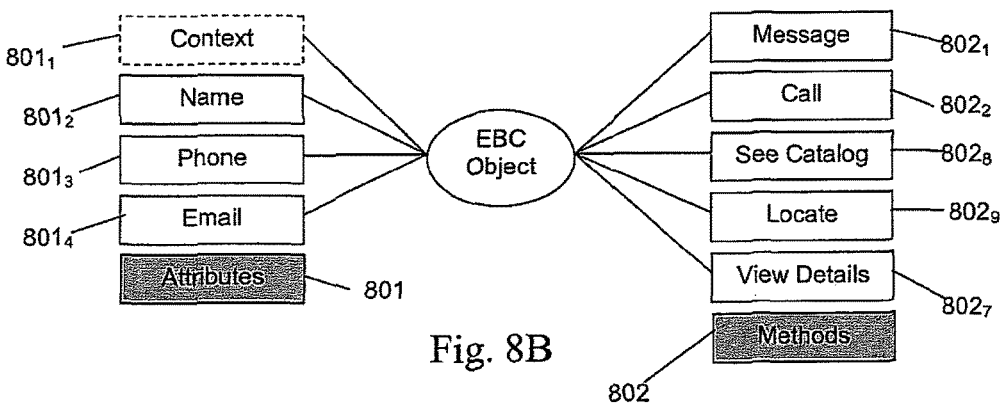
FIG. 8B is a conceptual diagram of one possible architecture of an EBC object assigned a particular context according to one embodiment of the present invention.
Figure 8C:
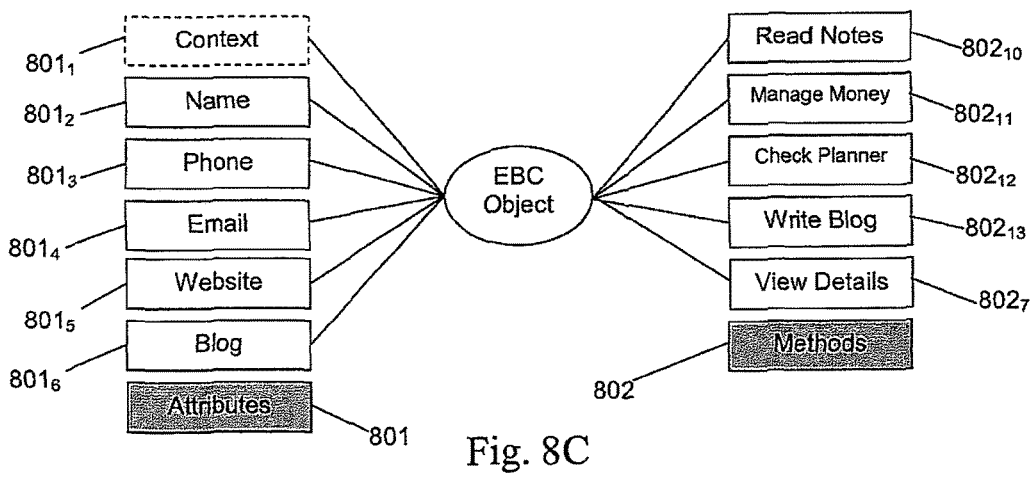
FIG. 8C is a conceptual diagram of one possible architecture of an EBC object assigned a particular context according to one embodiment of the present invention.

Conceptual diagrams of each of the EBC object structures for each of the above identified contexts are shown in FIGS. 8A, 8B and 8C. FIG. 8A depicts one possible structure for the context classification "Person". Per table 1 above, the EBC object structure for this context includes six attributes 801 (including the non-visible context attribute $801_1$) and 7 methods 802. The default attributes provide for this context include the name $801_2$ and phone $801_3$ attributes, as discussed above. In addition to these attributes, the EBC object structure also includes additional attributes which contain additional information concerning the person identified in the name attribute. These additional attributes can include, for example, an email attribute $801_4$, website attribute $801_5$, Blog attribute $801_6$. Each of the attributes 801 may be associated with one or more of the methods 802. As shown the seven methods provided under the "Person" context may include such actions as messaging $802_1$, call $802_2$, visit site $802_3$, read blog $802_4$, poke $802_5$, send money $802_6$ as well as the default view details $802_7$. The association of the various methods with the various attributes is discussed in greater detail below.

FIG. 8B depicts one possible EBC object structure for the context classification "Institution". As shown, the EBC object structure for this particular context includes four attributes 801 and 5 methods 802. The attributes 801 provided for this particular context include the name $801_2$, phone $801_3$, email $801_4$ and the non-visible context attribute $801_1$. The methods 802 associated with the attributes 801 in this instance include in addition to the default view details method $802_7$ and the messaging $802_1$ and call $802_2$ as were provided under the "Person" context. In addition to these methods, the "Institution" context includes a number of methods specific to the Institution context, in this particular example these context specific methods are the "see catalog" $802_8$ and "locate" $802_9$ methods. As the name suggests, the "see catalog" $802_8$, method is provided to allow the user to view the relevant product catalog for the institution identified in the associated name attribute, while the "Locate" $802_9$ method provides information regarding the location of the relevant institution identified in the associated name attribute.

One possible EBC object structure for the context "Device Owner" is illustrated in FIG. 8C. As specified in table 1 above the Device Owner context includes six attributes 801 and five methods 802. Thus, the focus in the Device Owner context is more on informational attributes 801 and less on methods 802. As shown, the informational attributes 801 provided under the Device Owner context are similar to the informational attributes provided under the Person context. In this case the Device Owner context includes in addition to the non-visible context attribute $801_1$, the name $801_2$, phone $801_3$, email $801_4$, website $801_5$, and blog $801_6$ attributes. The methods 802 provided under this particular context could include, for example, read notes $802_{10}$, manage money $802_{11}$, check planner $802_{12}$ and write blog $802_{13}$. As in the case of the above discussed contexts, the Device Owner context also includes the default view details 802 method.

From the above examples, it can be seen that each specific EBC object context defines a default set of attributes and methods. It would therefore be easy to conclude that since a specific context has a set of default attributes and methods, the resulting menu system for EBC objects for each specific context would be the same. However, not all EBC objects of the same context will have all attribute fields fully populated.

Figure 9:
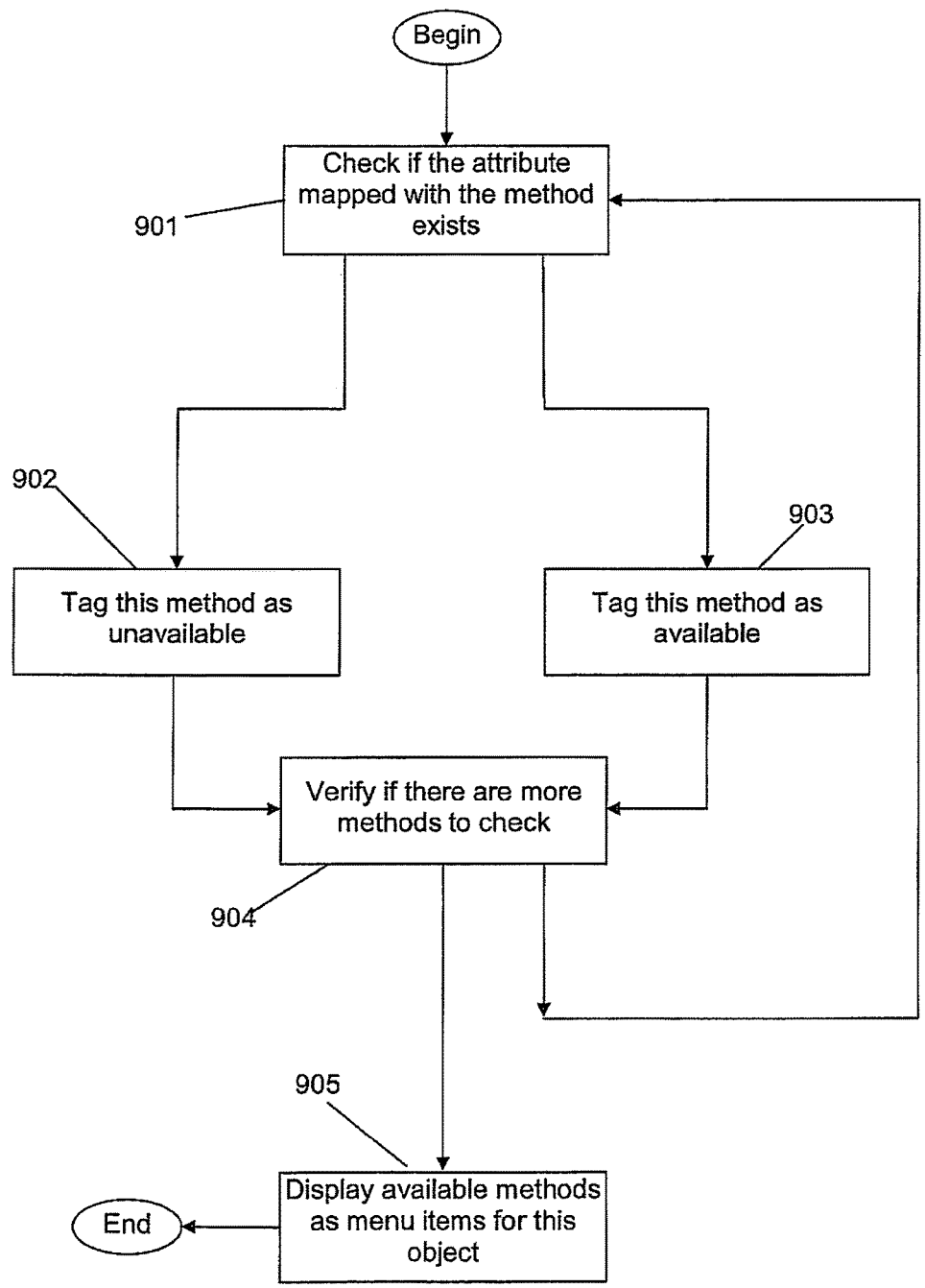
FIG. 9 is a flow diagram representing a service discovery process employed in one embodiment of the present invention.

In order to determine which methods are to be displayed to the user for a given EBC object, the menu engine employs a service discovery process. In essence the menu engine compares a mapping of the attributes with the methods. An example of the service discovery process is depicted in FIG. 9. As shown, the menu engine firstly determines if the attribute mapped to the method exists (step 901). If the attribute does not exist then the method is tagged as being unavailable (step 902), conversely if the attribute exists then the method is tagged as being available (step 903). The menu engine then determines whether there are any further methods to be checked (step 904) for the particular EBC object and if so, the menu engine repeats process steps 901, 902 or 903 (depending on availability of method) until there are no further methods to be checked at which point the menu engine generates a menu only containing menu (step 905)

items which corresponded to the methods tag as being available for the given EBC object.

As an example, consider EBC objects of the context "Person". Under this context the EBC object includes the "Read Blog" method which is mapped with the Blog attribute. The Blog attribute may have for its value either the Blog URL or null. It is this value that the menu engine reads during the step 901 to determine if the attribute exists. If the Blog attribute is null, the "Read Blog" method is not made part of the menu system associated EBC object. On the other hand, if there is a value corresponding to the Blog attribute, the "Read Blog" method becomes a menu item in the menu system associated with the particular EBC object.

While the above process of service discovery is performed on-the-fly as entries in the phonebook are manually created, the menu system resulting therefrom is not static. The menu engine may admit updates which can alter the appearance of the menu for a specific EBC object. Such updates may be triggered by any of the following events:

A broadcast from the information owner
Sharing of phonebook entry
Synchronization with the global directory service (as described above)

Figure 10A:
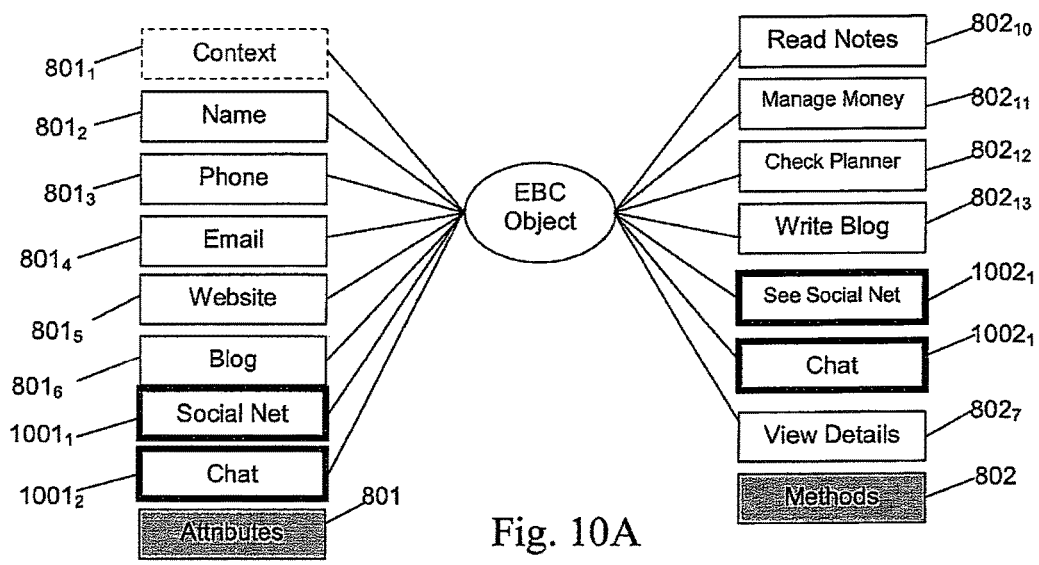
FIG. 10A is a conceptual diagram of one possible architecture of an EBC object assigned a particular context according to one embodiment of the present invention.

A broadcast from the information owner happens when an information owner uses the mobile network to send out an updated copy of the EBC object that pertains to a particular information owner. An information owner is one locally defined on a mobile device as an EBC object with the context of a "Device Owner". Certain tools are provided to such information owners to update and even change or alter the attributes and methods associated with the EBC object. The default set of attributes and methods associated with such EBC object is overridden by this customization. In the example illustrated in FIG. 10A, an information owner (Person A) has edited the details of their EBC object such that it includes new attributes and methods. In this particular case Person A has added two new attributes "Social Net" $1001_1$ and "Chat" $1001_2$ to the default attribute fields of the non-visible context attribute 801, the name $801_2$, phone $801_3$, email $801_4$, website $801_5$, and blog $801_6$ attributes. Likewise, two new methods (see Social Net $1002_1$, and Chat $1002_2$ have been added to the listing of default methods for the Device Owner context, namely read notes $802_{10}$, manage money $802_{11}$, check planner $802_{12}$ and write blog $802_{13}$.

As will be appreciated by one of skill in the art that while the EBC object of person A is considered locally as belonging the "Device Owner" context, it is viewed by other people's device as belong to the context "Person". Thus person A's EBC object would be viewed locally by the device of person B as an EBC object having at least the default attributes and methods of the Person context discussed above. As far as person B is concerned, the EBC object pertaining to person A will remain without the attributes "Social Net" and "Chat" and consequently without the methods "See Social Net" and "Chat" until an update person A's EBC object occurs i.e. person B's menu engine admits update via receipt of broadcast from the information owner, Sharing of phonebook entry with person A, or person B request to sync their listing of EBC objects with the global directory service (as discussed in relation to FIG. 6 above).

Sharing an EBC object is peer-to-peer, while broadcasting can be directed broadcast or simple broadcast. Directed broadcast is the simultaneous sending of his EBC object to a group of recipients, generally those selected from the phonebook of person A or any defined list of recipients. A simple broadcast, on the other hand, sends out the EBC to all possible recipients within a defined geographic region. In both cases, the effect is the same the recipient of the updated EBC object will have either the option to save the update or to reject it.

Figure 10B:
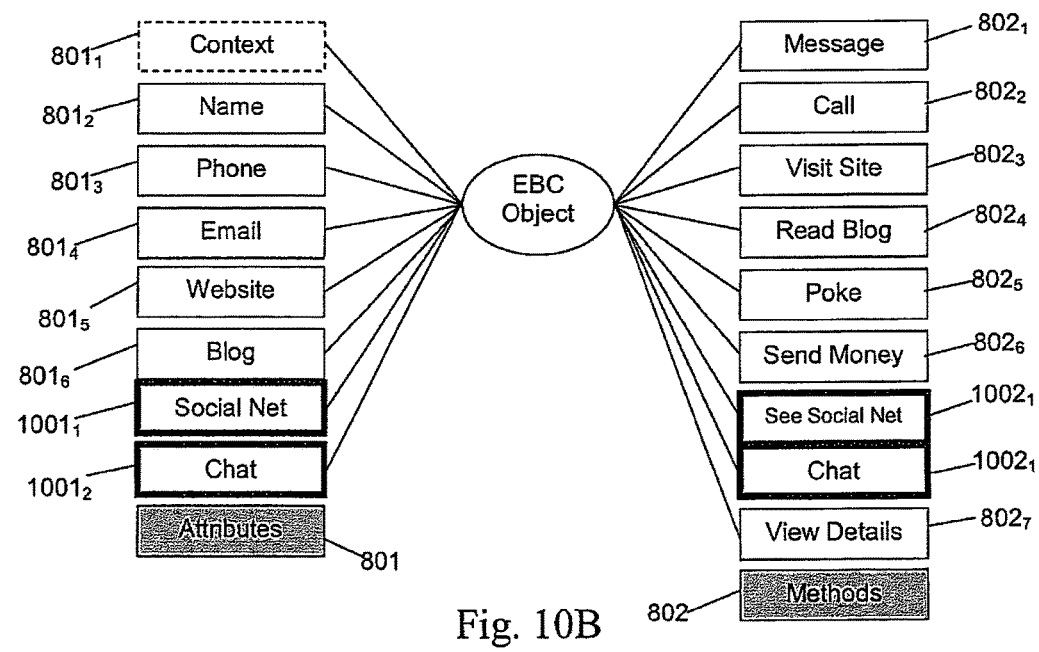
FIG. 10B is a conceptual diagram of the architecture of an EBC object assigned a particular context as viewed from a third party client device according to one aspect of the present invention.

If the recipient opts to accept the updated EBC, then the menu engine will initiate a menu update on-the-fly, that is, when the updated EBC object as shown in FIG. 10B is used. In the same example, if the recipient decides to access the updated EBC through his phonebook, the menu engine updates the menu system in the manner quite similar to the process illustrated through a service discovery process similar to that shown in FIG. 9.

Aside from the menu update, the menu engine can also rearrange how the methods are presented as menu items. For each EBC object, the methods are ranked based on the following criteria:

Success of transaction
Frequency of transaction
Cost of transaction
Other business rules In addition to the above, the methods which, based on the service discovery process described above, have been identified to be unavailable shall no longer be shown as part of the menu system, i.e. there is no menu item that corresponds to a method that invokes an unavailable service.

This adaptive rearrangement of menu items is done at all levels of a multi-level menu system. Thus, two EBC objects belonging to the same context will not have identically arranged set of menu items. Each EBC object will have a different arrangement of menu items based on how the device owner interacts with such object. A further criterion is included such that EBC objects which have not been used in user interactions for a predefined time period will have a default arrangement of menu items based on the general usage statistics of EBC objects of similarly context categories.

The menu system may also employ a masking function to allow users to interact with various individuals without the need to specifically identify each individual. The masking function makes use of a context classification know as the "Group" context. The "Group" context is further divided into local or global classes. An EBC object of the context "local group" is one that serves as an alias to a group of EBC objects stored locally on the user's device. Any action on the alias is an action on all the EBC objects linked to the local group alias. This action, however, will be limited to those that can be done in a group, such as sending an SMS.

Figure 11:
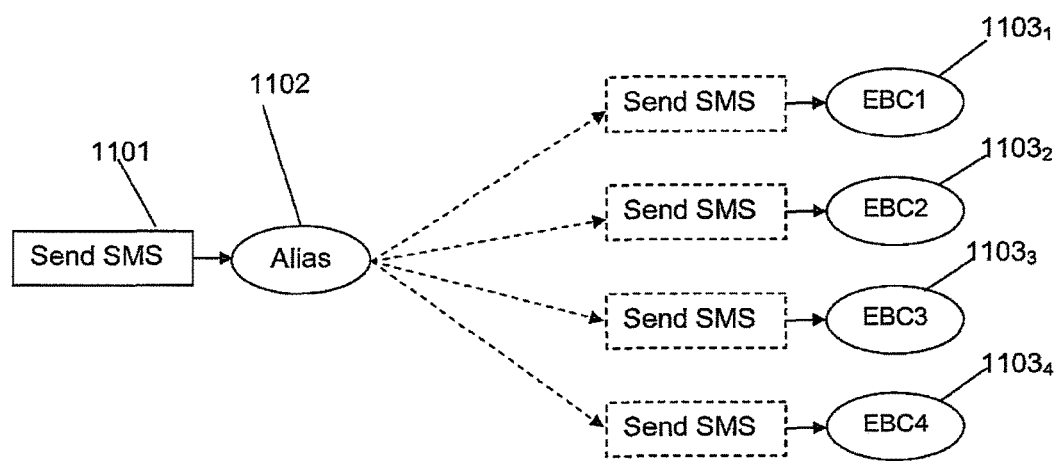
FIG. 11 is a diagram representing a masking function according to one embodiment of the present invention.

An example of the use of the masking function for the local group context is shown in FIG. 11. As shown the SMS 1101 is addressed using the local group alias 1102. The masking function proceeds to send the SMS to each individual indentified in the EBC objects $1103_1$, $1103_2$, $1103_3$, $1103_4$ contained in the local group.

An EBC object of the context "global group" may be similarly implemented. The difference, however, with a "local group" and a "global group" is that a "local group" is created by the device owner on the device, by masking EBC objects which are located on the device, while a "global group" is an EBC object from a global directory service which serves as a pointer to other EBC objects. The masked EBC objects in a "local group" are known to the device owner because instances of these masked objects are supposed to be stored in the device, while the masked EBC objects in a "global group" are not known to the device owner. The masked EBC objects in a "global group" are stored in the directory service database.

Figure 12:
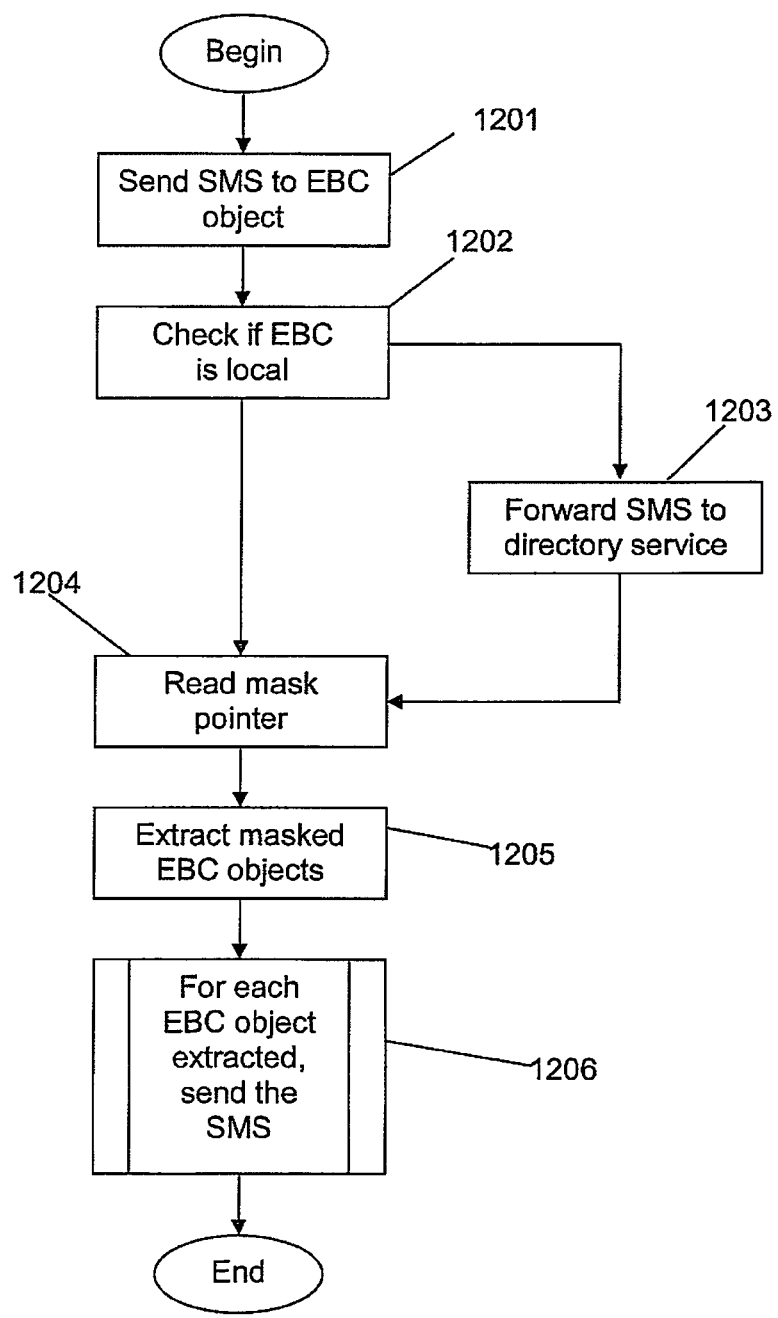
FIG. 12 is a flow diagram representing the implementation of a masking function according to a further embodiment of the present invention.

FIG. 12 illustrates the use of the masking function for sending a message to an EBC objects in either the local or global group context. As shown the user sends the SMS to the group context alias (step 1201). The masking function then proceeds to check if the group context attribute is a local group (step 1202). If the group is determined to be a local group then the masking function proceeds to read the mask pointer attribute (step 1204) which identifies all EBC objects contained in the group. The masking function then proceeds to extract the EBC objects from the local listing of EBC objects (step 1205) and send the SMS to each of individual identified by the extracted EBC objects (step 1206).

In the event that the group is a global group the masking function forwards the SMS to the global directory service (step 1203). The global directory service then proceeds to read the mask pointer (step 1204) in order to extract the relevant EBC objects (step 1205) from its database. Once the global directory has extracted the EBC objects contained in the group, it then proceeds to forward the SMS each of individual identified by the extracted EBC objects (step 1206).

It is to be understood that the above embodiments have been provided only by way of exemplification of this invention, and that further modifications and improvements thereto, as would be apparent to persons skilled in the relevant art, are deemed to fall within the broad scope and ambit of the present invention described herein.

What is claimed is:

1. A method of transferring contact information between a plurality of subscribers in a system said method comprising the steps of:
compiling at a first subscriber terminal the contact information associate with a first subscriber into an electronic business card;
encapsulating the electronic business card in an electronic business card object by mapping at least one textual field of the electronic business card to at least one object attribute contained in the electronic business card object;
transmitting the electronic business card object to a directory;
storing the electronic business card object in a database;
receiving at a second subscriber terminal the electronic business card object, in response to a request by a second subscriber;
determining, by a menu engine included in the second subscriber terminal, which methods are to be displayed based on whether the at least one object attribute mapped to a method exists; and
displaying menu items representing determined methods which can be performed in association with each object attribute contained in the electronic business card object, wherein the at least one object attribute is associated with the at least one textual field of the electronic business card and the methods are actions which can be done to the electronic business card object,
wherein the system is operable to generate a specific number which is used for bidirectional communication between the first subscriber and the second subscriber as a unique communication identifier between the first subscriber and the second subscriber, and
wherein use of the specific number by a third party to connect to the first subscriber or the second subscriber is restricted.

2. The method of claim 1, further comprising the step of registering the electronic business card with the directory wherein the step of registering further comprises the step of validating a set of subscriber credentials.

3. The method of claim 2 wherein the subscriber credentials of the first subscriber comprise the mobile phone number of the requesting party and any such information which can be obtained from said party without its active knowledge or participation.

4. The method of claim 2 wherein the subscriber credentials of the first subscriber comprise at least one of the following: a PIN, password, and any such information which a party has to explicitly provide.

5. The method of claim 1, further comprising the steps of:
receiving at the directory a set of search parameters from the second subscriber; and
searching the database for electronic business card objects that match the search parameters,
wherein the search parameters are set of keywords.

6. The method of claim 5 wherein the step of receiving the search parameters further comprises the step of parsing the received keywords prior to initiating the search.

7. The method of claim 1 further comprising the step of allowing the first subscriber or any authorized party to update or delete any of the at least one object attribute of the electronic business card object.

8. The method of claim 7 wherein the step of updating the at least one object attribute and methods of the electronic business card object is performed via a plurality of user interfaces.

9. The method of claim 8 wherein the user interfaces comprises at least one of the following: a web or a wap interface, a local application, or a menu system using email, SMS, MMS, flash message, or an IP technology.

10. The method of claim 1 further comprising the step of receiving a request for synchronization from a subscriber.

11. The method of claim 10 wherein the step of synchronization further comprises the steps of:
verifying the existence of the electronic business card object requested to be synchronized;
verifying privacy or access level settings of the electronic business card object requested to be synchronized;
sending an actionable notification to an owner of the electronic business card object requested to be synchronized for the allowance or disallowance of the request based on the privacy or access level settings of the electronic business card object;
sending a synchronization update or a copy of the electronic business card object requested to be synchronized or downloaded to the requesting subscriber on allowance of the synchronization request; and
sending an appropriate notification to the requesting party.

12. The method of claim 1 further comprising the step of verifying and authenticating a content of the electronic business card object.

13. The method of claim 12 wherein the step of verifying and authenticating further comprises the steps of:
tagging an object requested to be verified as certified on successful verification or authentication of a data in the electronic business card object; and
sending an appropriate notification to a concerned party.

14. The method of claim 12 wherein the step of verifying and authenticating further comprises the steps of:
verifying the electronic business card object via confidence level scoring; and
subsequently tagging those objects yielding a confidence level equal to or higher than a predefined threshold, as verified.

15. The method of claim 1 wherein the electronic business card object is a pointer to and a mask of a plurality of electronic business card objects, such that any user action on the electronic business card object acting as pointer to a plurality of electronic business card objects is effectively a same action individually on each of the electronic business card objects in such plurality of electronic business card objects.

16. The method of claim 1 further comprising the steps of:
providing a listing of electronic business card objects to the second subscriber by sorting and filtering the search results; wherein sorting the listing of the electronic business card objects is in accordance with one of the following: a weighting accorded to the verified status of an object; confirmed relationships as attributes of an object; level of keyword match precision; recency of information or Boolean operation;
receiving at the directory the request from the second subscriber for the electronic business card object from the provided listing of electronic business card objects; and
forwarding the requested electronic business card object to the second subscriber terminal.

17. The method of claim 1 wherein the electronic business card object comprises at least one actionable element comprising scripts that launch a native device application, launch an application or service, and initiate a web-based or a wap-based interface.

18. A system for transferring contact information between a plurality of subscribers said system comprising:
at least one server;
a first subscriber terminal operable to compile the contact information associated with a first subscriber into an electronic business card, encapsulate the electronic business card in an electronic business card object by mapping at least one textual field of the electronic business card to at least one object attribute contained in the electronic business card object, and transmit the electronic business card object to a directory;
a database coupled to the server and operable to store the electronic business card object; and
a second subscriber terminal operable to receive the electronic business card object in response to a request by a second subscriber,
determine by a menu engine which methods are to be displayed based on whether the at least one object attribute mapped to a method exists, and display menu items representing determined methods which can be performed in association with each object attribute contained in the electronic business card object, wherein the at least one object attribute is associated with the at least one textual field of the electronic business card and the methods are actions which can be done to the electronic business card object,
wherein the system is operable to generate a specific number which is used for bidirectional communication between the first subscriber and the second subscriber as a unique communication identifier between the first subscriber and the second subscriber, and
wherein use of the specific number by a third party to connect to the first subscriber or the second subscriber is restricted.

19. The system of claim 18 wherein the menu engine is adapted to read each object attribute contained in the electronic business card object and display a plurality of menus containing the menu items representing the methods which can be performed in relation to the contact information represented by the electronic business card object.

20. The system of claim 19 wherein the electronic business card object is assigned a context and the menu engine is adapted to generate a set of default menu items for the assigned context.

21. The system of claim 20 wherein the menu engine is adapted to modify the set of default menu items for the context in response to modification of the at least one object attribute of the electronic business card object by an owner of the electronic business card object.

22. The system of claim 18 wherein the electronic business card object is a pointer to and a mask of a plurality of electronic business card objects, such that any user action on the electronic business card object acting as pointer to a plurality of electronic business card objects is effectively a same action individually on each of the electronic business card objects in such plurality of electronic business card objects.

23. The system of claim 18 wherein in response to the request by the second subscriber, the server configured to provide a listing of electronic business card objects to the second subscriber by sorting and filtering search results; wherein sorting the listing of the electronic business card objects is in accordance with one of the following: a weighting accorded to the verified status of an object; confirmed relationships as attributes of an object; level of keyword match precision; recency of information or Boolean operation.

24. The system of claim 18 wherein the electronic business card object comprises at least one actionable element comprising scripts that launch a native device application, launch an application or service, and initiate a web-based or a wap-based interface.

* * * * *